(12) United States Patent
Francise

(10) Patent No.: US 6,698,760 B2
(45) Date of Patent: Mar. 2, 2004

(54) EDUCATIONAL GAME

(76) Inventor: Angie Francise, 1229 Ashland, Houston, TX (US) 77002

(*) Notice: Subject to any disclaimer, the term of this patent is extended or adjusted under 35 U.S.C. 154(b) by 21 days.

(21) Appl. No.: 10/044,371

(22) Filed: Jan. 10, 2002

(65) Prior Publication Data

US 2003/0130071 A1 Jul. 10, 2003

(51) Int. Cl.$^7$ .............................. A63F 9/00; A63F 1/00
(52) U.S. Cl. ................ 273/429; 273/273; 273/288; 273/287; 273/308
(58) Field of Search .................... 273/440, 447, 273/459, 292–308, 157 R, 288, 429, 430, 431; 434/128, 129

(56) References Cited

U.S. PATENT DOCUMENTS

| | | | | | |
|---|---|---|---|---|---|
| 243,855 | A | * | 7/1881 | Crandall | 273/292 |
| 887,464 | A | * | 5/1908 | Creasey | 273/243 |
| 1,243,263 | A | * | 10/1917 | Cohen | 273/308 |
| 1,617,772 | A | * | 2/1927 | Sergel | 273/308 |
| 1,617,773 | A | * | 2/1927 | Sergel | 273/307 |
| 2,072,799 | A | * | 3/1937 | Creswell | 273/308 |
| 4,213,531 | A | * | 7/1980 | Rae | 206/463 |
| 4,369,976 | A | * | 1/1983 | Chunn | 273/303 |
| 4,423,876 | A | * | 1/1984 | Boyd | 273/294 |
| 4,723,930 | A | * | 2/1988 | Freese et al. | 446/93 |
| 5,405,148 | A | * | 4/1995 | Cianci | 273/273 |
| 5,417,432 | A | * | 5/1995 | Dwyer | 273/299 |
| 5,628,513 | A | * | 5/1997 | Soriano | 273/157 R |
| 5,772,212 | A | * | 6/1998 | Hagedorn | 273/299 |
| 6,247,697 | B1 | * | 6/2001 | Jewett | 273/292 |
| 6,290,230 | B1 | * | 9/2001 | Anthony | 273/447 |
| 6,454,265 | B1 | * | 9/2002 | Elliott et al. | 273/292 |

FOREIGN PATENT DOCUMENTS

WO 99/37370 * 7/1999 .............. A63F/1/00

* cited by examiner

Primary Examiner—Raleigh W. Chiu
(74) Attorney, Agent, or Firm—Shook, Hardy & Bacon LLP

(57) ABSTRACT

A game system including a large container, and a plurality of small containers. The game system further including figurines reflecting different types of animals, said game system including a player attempting to match up the various animals after drawing them from the large container.

4 Claims, 2 Drawing Sheets

EDUCATIONAL GAME

FIELD OF THE INVENTION

This invention relates to a matching game and, more particularly, to a matching game that centers around the biblical story of Noah's Ark.

BACKGROUND OF THE INVENTION

Games provide a very important educational development purpose for children. More specifically, games are used to educate children with respect to certain historical, religious, and/or current events. Still further, games can be utilized to educate children as to the environment that surrounds them. Games also are utilized to intellectually challenge children to teach them basic recognizance, matching, and counting skills. As is apparent, a game must not only have the ability to teach such skills, but also must have the ability to maintain a child's interest by being entertaining and fun to play.

Therefore, a game is needed which accomplishes the goals discussed above, while at the same time being capable of maintaining a child's interest.

SUMMARY OF THE INVENTION

Accordingly, it is an object of the present invention to provide a game which is educational.

It is another object of the present invention to provide a game in which children are taught to recognize animals of all shapes, sizes and colors.

It is a still further object of the present invention to provide a game which teaches children about a biblical event.

It is a still further object of the present invention to teach children the fundamentals of "game playing."

Another object of the present invention is to teach children the art of competing against one another in a game-playing situation.

Additional objects, advantages and novel features of the invention will be set forth in part in a description which follows and in part will become apparent to those skilled in the art upon examination of the following, or may be learned by practice of the invention.

These and other objectives are accomplished by a game system including a hollow container and a plurality of small containers. The game system further includes a plurality of pairs of game pieces, wherein each pair of game pieces depicts a different type of animal. Each game piece is placed in a small container which is thereafter placed in the larger container. Players withdraw the smaller containers from the larger container in an attempt to mate pairs of the game pieces.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE PREFERRED EMBODIMENTS

The preferred embodiment of the present invention centers around Noah's Ark and is based upon the story of the Great Flood, as reflected in the Old Testament of the Bible. During the story of the Great Flood, animals of all shapes, sizes and colors were boarded onto an ark to be saved from the flood waters. All other species were eliminated by the flood. The biblical story revolves around Noah collecting a pair of each animal on earth, and thereafter boarding the animals in pairs onto the ark so that they could be saved from drowning. After the flood, the animals were freed from the ark to thereafter repopulate the earth.

Figure 1:
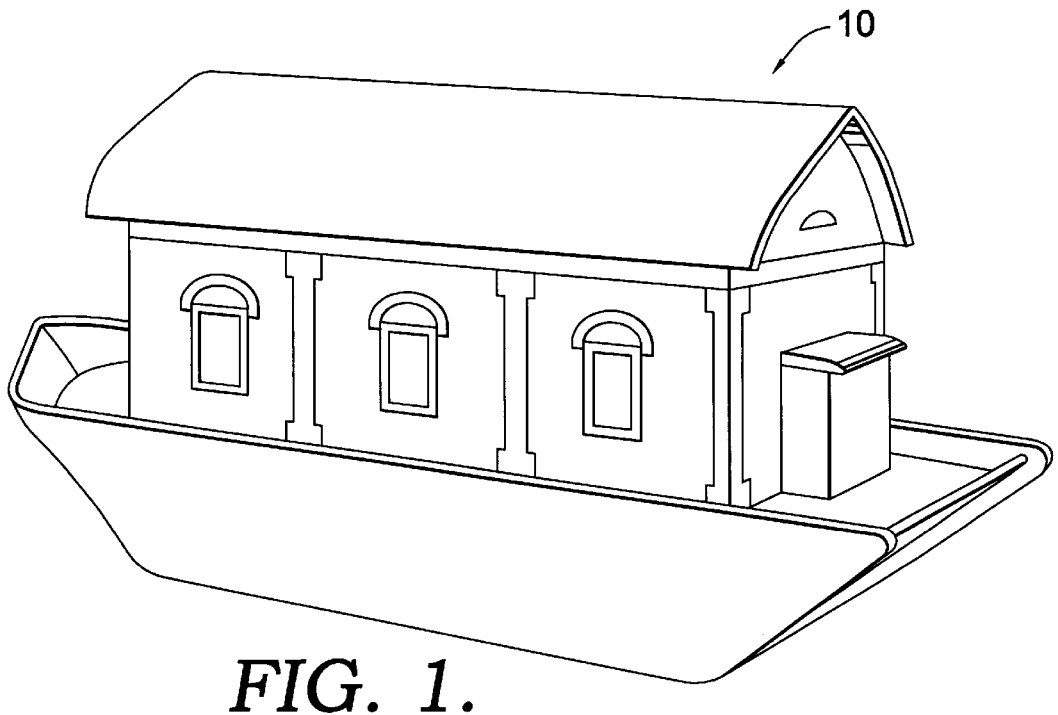
FIG. 1 is a top perspective view of a hollow container according to the present invention and in the shape of an ark.
Figure 2:
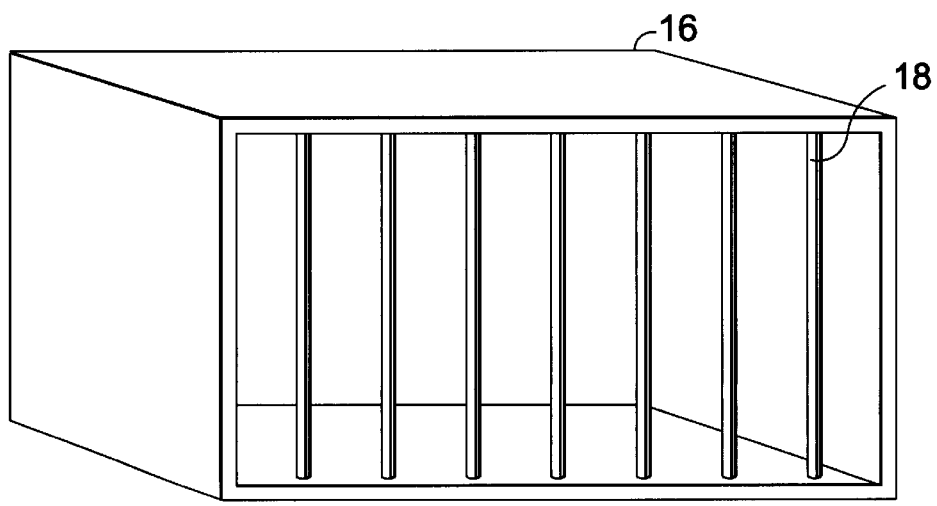
FIG. 2 is a top perspective view of a smaller figurine container of the present invention, the figurine container in the shape of a cargo box with an open bar depiction on one side.
Figure 3:
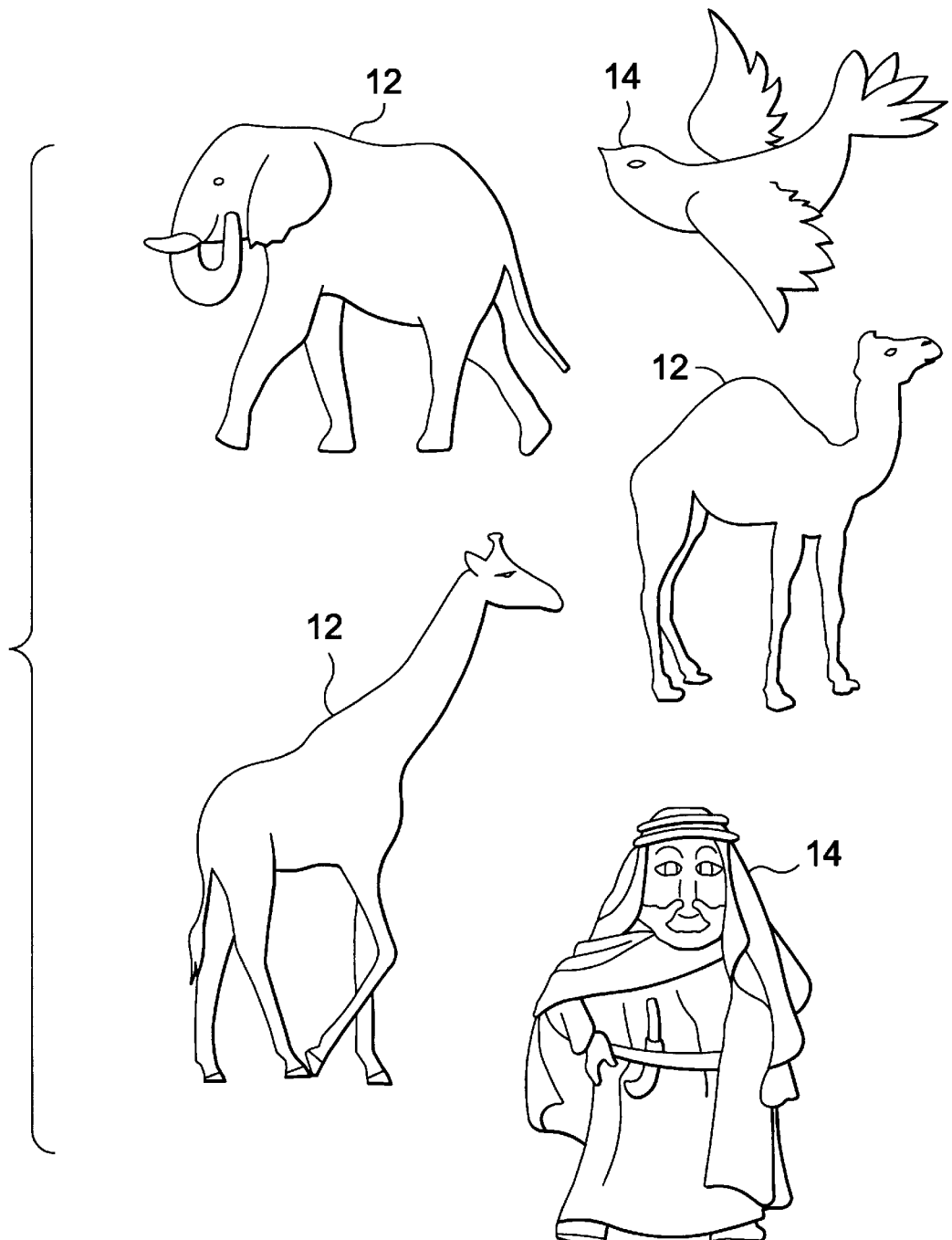
FIG. 3 is a front elevational view of figurines according to the present invention and for a Noah's Ark version of the invention.

With reference to FIG. 1, the preferred embodiment of this game includes one large plastic hollow container 10, in the shape of an ark. As is apparent, the container need not necessarily be in the shape of an ark, but can be in the shape of any other suitable symbolic structure or figure, and need not necessarily be made of plastic. Ark 10 in FIG. 1 can have a hinged roof which allows storage of game pieces as will be further described below. With reference to FIG. 3, the game further includes at least twenty-four pairs of game pieces 12 reflecting various figures associated with the game, preferably in the shape of animals. For instance, as shown in FIG. 3, there may be a pair of giraffes, camels, and/or elephants, etc. These pairs of game pieces can be made of any suitable material, for instance, injection molded plastic. Still further, the game pieces include at least two pairs of wild tokens 14. Each pair of wild tokens can represent a figure associated with the event to be learned about. For instance, with reference to FIG. 3, the tokens can be a pair of Noah depictions, or a pair of dove depictions. Still further, with reference to FIG. 2, the game pieces can include 52 small containers 16, preferably in the shape of a cargo box. More specifically, such boxes preferably are completely enclosed except for one side which has a vertical bar configuration 18 to allow viewing of the interior of the box, thus representing a cage. The boxes allow viewing into the interior without having other players of the game see the interior. The games pieces 12 also preferably include a legend card (not shown) with pictures of each animal in alphabetical order on one side and directions of how to play the game on the other side.

The game is preferably designed for children ages 4 to 7, but may be suitable for many other ages. In general, the preferred rules of the game are as follows:

1. Each animal 12 and wild token 14 is placed in a cargo box 16. The purpose of the cargo box 16 is to allow for random selection of an animal 12 from the large ark 10. Once filled with an animal or wild token, the cargo boxes are placed inside the large hollow ark. Animals remain in their cargo box until the mate is found. As discussed above, the cargo box is closed on all sides except one where vertical bars 18 allow the player to see into the cargo to identify the animal. This design allows a player to place the cargo box with the "open side" facing him/her so he/she can see the identity of the animal in the cargo box while at the same time hiding the identity of the animal from opposing players.

2. To determine who goes first, each player picks a cargo box out of the large ark. The player with the animal whose name begins closest to the letter "A" begins the game. (The animal legend can be consulted for an alphabetical listing of animals). Each player keeps the first animal selected as the first of the six animals each player will start the game with.

3. Each player, beginning with who is selected to go first, picks five additional cargo boxes out of the large ark. The player to the right of the first player goes next and so on. As the next five cargo boxes are picked by each player, the players should place their cargo boxes in front of them, being very careful not to show their opponents which animals were randomly selected.

4. The first player chooses an opponent and asks the opponent if he/she has an animal that will form a pair with one of the animals in the cargo boxes he possesses. If the opponent has the animal, the opponent must surrender the animals (in the cargo box) to the first player. The first player must then display the pair of animals. The pair is taken out of the cargo boxes and displayed near the player who possesses the pair.

5. If the opponent does not have the requested animal, the first player will randomly pull a cargo box from the large ark. If the player pulls the pair to the animal he requested, then the first layer must display the pair.

6. The first player is allowed to continue as long as either (a) his/her request results in pairing an animal with one he/she possesses, or (b) his/her random draw results in a pair.

7. If the first player does not create a pair with his/her request and/or resulting draw, then the next player gets his/her turn following the rules established in #4, #5 and #6 above.

8. The wild tokens can be paired with any animal.

9. The first player of the four players to collect seven pairs wins the game. If three players compete, the first player to collect ten pairs wins the game. If two players compete, the first player to collect 14 pairs wins the game.

10. Advanced Rule: For older children or children that have mastered the above rules, the game can be played whereby wild tokens have extra value if they are paired with the second wild token of its type. For example, if the two Noahs are paired, the pair is worth four pairs. The same applies to the pairing of the doves. Additionally, if the Noah and a dove are paired, the pair is worth three pairs.

As is apparent, the above game teaches children the ability to recognize animals of all shapes, sizes and colors because of the matching aspect of the game. Still further, the child is taught how to compete against other children, and the strategy of asking appropriate questions of various players in order to attempt to win the game. Additionally, it may be possible to utilize cards to depict the animals, instead of the animal figurines described above. This provision would allow for a travel version, and would also not have the necessity of a hollow ark playing piece. Still further, in such a card version, the cards could reflect interesting educational facts about the animal.

A computer readable medium version is contemplated wherein a player may have the ability to play against the computer or other players. In addition to the animals of Noah's Ark, other possible additions of the game are contemplated. For instance, below is a list of the potential animals and wild tokens for the Noah's Ark Edition. Also below is an additional Canine Edition, Ocean Edition, and Endangered Species Edition. Other possible editions include insects, dinosaurs, and birds.

| Original Noah's Ark | | | |
|---|---|---|---|
| Giraffe | Elephant | Camel | Wild Tokens: |
| Zebra | Hippopotamus | Monkey | Dove |
| Lion | Gorilla | Ostrich | Noah |
| Rhinoceros | Tiger | Anteater | |
| Cow | Sheep | Donkey | |
| Horse | Pig | Fox | |
| Chicken | Goose | Beaver | |
| Goat | Deer | Rabbit | |
| Canine Edition | | | |
| Collie | German Shepherd | St. Bernard | Wild Tokens: |
| Greyhound | Dalmatian | Poodle | Dog Catcher |
| Boxer | Labrador | Basset Hound | Bone |
| Dachshund | Rottweiler | Pomeranian | |
| Great Dane | Weimaraner | Pekingese | |
| Shih Zu | Terrier | Bulldog | |
| Cocker Spaniel | Beagle | Sheep Dog | |
| Chihuahua | Golden Retriever | Husky | |
| Ocean Edition | | | |
| Blowfish | Octopus | Hammerhead Shark | Wild Tokens: |
| Dolphin | Starfish | Claim | Mermaid |
| Eel | Snail | Jellyfish | Pirate |
| Lobster | Stingray | Sea Horse | |
| Anemone | Walrus | Humpback Whale | |
| Seal | Sea Turtle | Swordfish | |
| Squid | Man-o-War | Great White Shark | |
| Killer Whale | Coral | Crab | |
| Endangered Species Edition | | | |
| Bat | Caribou | Jaguar | Wild Tokens: |
| Kangaroo | Manatee | Otter | Forest Ranger |
| Grizzly Bear | Seal | Albatross | Coast |
| Bald Eagle | Pelican | Alligator | Guardsman |
| Sturgeon | Bighorn Sheep | Squirrel | |
| Gray Wolf | Crane | Sea Lion | |
| Mallard Duck | Owl | Stork | |
| Woodpecker | Iguana | Gecko | |

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A method of playing a matching game, including a plurality of pairs of figurine game pieces, each pair of figurine game pieces depicting a different type of animal, comprising:

positioning the figurine game pieces randomly at a single location;

allowing each player to choose one figurine game piece from the location while concealing the identity of the animal depicted on the figurine game piece from the other players;

allowing each player to pick an opponent player and query whether that opponent player has a match for the animal depicted on the first player's figurine game piece;

determining a winner of the game by a player obtaining a set number of pairs of matching figurine game pieces.

2. The method of claim 1, wherein said animals reflect the animals of Noah's Ark.

3. The method of claim 1, wherein said game pieces reflect one of canine breeds, seal life, endangered species, insects, dinosaurs, and birds.

4. The method of claim 1, further including wild game pieces which allow the making of a pair with any other game piece.

* * * * *